United States Patent Office 3,496,187
Patented Feb. 17, 1970

3,496,187
N-(HETEROCYCLYL)ACONAMIDES
Francois T. Bruderlein, Montreal, Quebec, and David J. Campbell, Pincourt, Montreal, Quebec, Canada, assignors to American Home Products Corporation, New York, N.Y., a corporation of Delaware
No Drawing. Filed Mar. 20, 1967, Ser. No. 624,208
Int. Cl. C07d 99/10; A61k 27/00
U.S. Cl. 260—305                              9 Claims

ABSTRACT OF THE DISCLOSURE

There are disclosed herein certain N-thiazolyl-, N-thiadiazolyl-, and N-benzothiazolyl-aconamides, in particular N-(2'-thiazolyl)-, N-2'-(5'-nitrothiazolyl)-, N-2'-(4'-methylthiazolyl)-, N-2'-(1',3',4'-thiadiazolyl)-, N-2'-(5'-methyl-1',3',4'-thiadiazolyl)-, N-(2'-benzothiazolyl)- and N-2'-(4'-chlorobenzothiazolyl)-aconamide. The compounds are amebicidal and antibacterial agents, and methods for their preparation and use are also given.

The present invention relates to N-(heterocyclyl)-aconamides in which the heterocyclic moiety is selected from the group consisting of optionally substituted thiazoles, thiadiazoles, and benzothiazoles. The compounds of this invention may be represented by the following formulae:

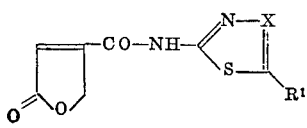

and

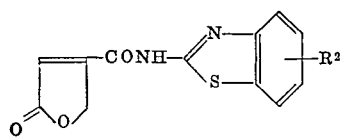

in which X represents CH or N, $R^1$ represents hydrogen, methyl, or the nitro group, and in which $R^2$ represents hydrogen or halogen.

The compounds of this invention are distinguished by possessing amebicidal activity, especially against *Endamoeba histolytica*. They also possess anti-bacterial activity against a number of pathogenic microorganisms such as, for example, *Staphylococcus pyogenes* (both penicillin sensitive and penicillin-resistant strains), *Sarcina lutea*, *Streptococcus faecalis*, *Escherichia coli*, *Aerobacter aerogenes*, *Salmonella pullorum*, *Pseudomonas aeruginosa*, *Proteus mirabilis*, and *Proteus vulgaris*.

As amibicidal agents, the compounds of this invention may be administered orally or by injection. For oral administration, the compounds of this invention may be formulated with suitable excipients in the form of tablets or capsules containing from 5 to 100 mg. of the active ingredient per dosage form and may be administered from one to three times per day as directed by the physician. For administration by injection, the compounds of this invention may be formulated in suspension in aqueous vehicles or in vegetable oils containing from 5 to 100 mg. of the active ingredient per unit dosage and may be administered subcutaneously or intramuscularly, preferably once a day.

As antibacterial agents, the compounds of this invention may be formulated as solutions, creams, or lotions containing from 0.1–1.0 percent of the active ingredient and may be applied topically to infected areas.

More specifically, the compounds of this invention are preferably prepared by reacting an aconyl halide, such as, for example, aconyl chloride described by Funke et al. in Bull. Soc. Chim. 1950, p. 346, with a suitable heterocyclic amine, preferably, in a non-polar solvent, such as, for example, benzene, methyl ethyl ketone, or tetrahydrofuran, and preferably at the reflux temperature of the mixture. The reaction is usually complete within a period of time of from one-half to five hours, the reaction product is isolated from the mixture either by filtration or by evaporation of the solvent and crystallization of the residue.

The following examples will illustrate this invention. All compounds are identified by infrared spectrography and by elemental analysis.

EXAMPLE 1

N-2'-(5'-nitrothiazolyl)-aconamide

Aconyl chloride (5 g.) and 5-nitro-2-amino-thiazole (4.5 g.) in 50 ml. of tetrahydrofuran are refluxed for one half hour. The mixture is evaporated to dryness and the residue is recrystallized from methanol to yield the title compound with M.P. 208–210° C.

EXAMPLE 2

N-2'-(4'-methylthiazolyl)-aconamide

In the same manner as described in Example 1 but using 2-amino-4-methylthiazole as starting material, the title compound is obtained and recrystallized from ethanol to M.P. 171–172° C.

In the same manner, but using 2-aminothiazole as starting material, N-(2'-thiazolyl)-aconamide is obtained.

EXAMPLE 3

N-(2'-benzothiazolyl)-aconamide

A solution of 2-aminobenzothiazole (3.5 g.) and aconyl chloride (3.41 g.) in 70 ml. tetrahydrofuran is refluxed for 2¾ hours. After cooling, the solution is concentrated to dryness and the solid is crystallized from acetone, to yield the title compound with M.P. 219–223° C.

EXAMPLE 4

N-2'-(4'-chlorobenzothiazolyl)aconamide

Equivalent amounts of aconyl chloride and 4-chloro-2-aminobenzothiazole are dissolved in tetrahydrofuran and refluxed for three hours. The reaction mixture is treated with charcoal, evaporated, and the residue crystallized twice from acetone-ethanol, to yield the title compound with M.P. 231–233° C.

In the same manner, but using 5-chloro-, 6-chloro-, 6-fluoro-, 6-bromo-, 6-iodo-, or 7-chloro-2-aminobenzothiazole as starting materials, the corresponding N-2'-(5'-chlorobenzothiazolyl)-, N-2'-(6'-chlorobenzothiazolyl)-, N-2'-(6'-fluorobenzothiazolyl)-, N-2'-(6'-bromobenzothiazolyl)-, N-2'-(6'-iodobenzothiazolyl)- and N-2'-(7'-chlorobenzothiazolyl)-aconamides are respectively obtained.

EXAMPLE 5

N-2'-(5'-methyl-1,3,4-thiadiazolyl)aconamide

One equivalent of 5-methyl-2-amino-1,3,4-thiadiazole and one equivalent of aconyl chloride in methyl ethyl ketone are refluxed for five hours. The solid is filtered off and recrystallized twice from N,N-dimethyl formamide to yield the title compound with M.P. 226–227° C.

In the same manner, but using 2-amino-1,3,4-thiadiazole as starting material, N-2'-(1',3',4'-thiadiazolyl) aconamide is also obtained.

We claim:
1. A compound of the formula

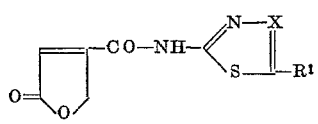

wherein X is selected from the group consisting of CH and N, and $R^1$ is selected from the group consisting of hydrogen, methyl and nitro.

2. N-(2'-thiazolyl)-aconamide, as claimed in claim 1.
3. N-2'-(5'-nitrothiazolyl)-aconamide, as claimed in claim 1.
4. N-2'-(4'-methylthiazolyl)-aconamide, as claimed in claim 1.
5. N-2'-(1',3',4'-thiadiazolyl)-aconamide, as claimed in claim 1.
6. N - 2'-(5'-methyl-1',3',4'-thiadiazolyl)-aconamide, as claimed in claim 1.

7. A compound of the formula

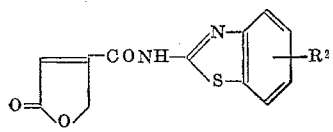

wherein $R^2$ is selected from the group consisting of hydrogen and halogen.

8. N - (2' - benzothiazolyl) - aconamide, as claimed in claim 7.
9. N-2'-(4'-chlorobenzothiazolyl)-aconamide, as claimed in claim 7.

References Cited
UNITED STATES PATENTS

| | | | |
|---|---|---|---|
| 2,735,798 | 2/1956 | Kupferberg et al. | 260—306.8 |
| 3,444,178 | 5/1969 | Bachman | 260—306.8 |

ALTON D. ROLLINS, Primary Examiner

U.S. Cl. X.R.

260—306.8; 424—270